W. H. HENKEL.
Dumping-Wagon.
No. 166,101. Patented July 27, 1875.
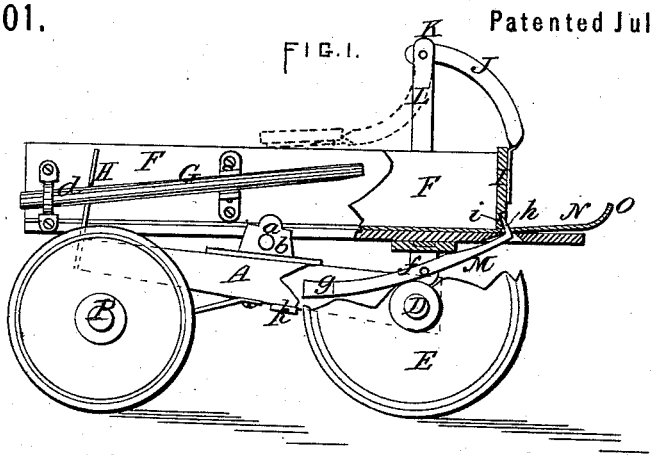
FIG. I.
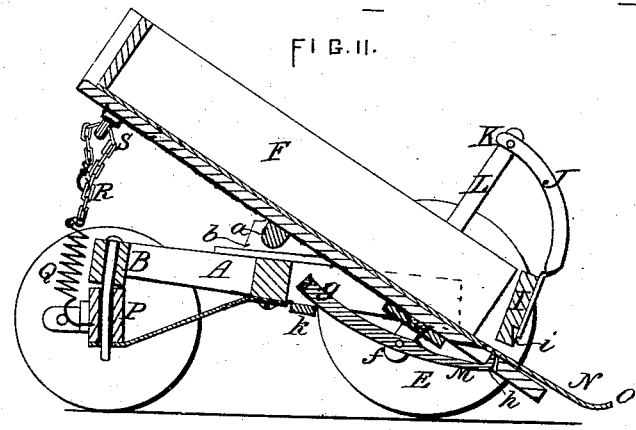
FIG. II.
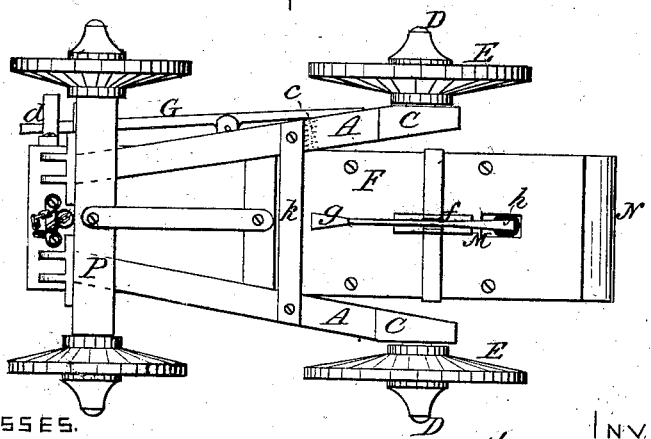
FIG. III.
WITNESSES.
F. B. Townsend
J. H. Rutherford
INVENTOR.
William H. Henkel
By Johnson & Johnson
his Attorneys.

UNITED STATES PATENT OFFICE.

WILLIAM H. HENKEL, OF MORTON, INDIANA.

IMPROVEMENT IN DUMPING-WAGONS.

Specification forming part of Letters Patent No. 166,101, dated July 27, 1875; application filed May 4, 1875.

*To all whom it may concern:*

Be it known that I, WILLIAM H. HENKEL, of Morton, in the county of Putnam and State of Indiana, have invented certain new and useful Improvements in Dumping-Wagons; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My improvements are designed to render more effective that class of dumping-wagons, in which the body does not slide to the rear in dumping the contents, but turns between rear wheels having short axles. These improvements consist in the combination, with the tail-board or end gate and the body of a wagon, of curved gate-carrying arms, mounted by a cross pivot-rod upon side standards, whereby the gate is carried both upward and outward by the tilting of the body.

The invention further consists in extending the bottom of the wagon-body in rear of the sides thereof, and providing the same with an upwardly-turned or flanged rear end, which is designed to prevent the lower layer or layers of bricks from falling out before the top courses, thus preventing breakage of the same to a considerable extent.

The invention consists in connecting a spiral spring and chain to the front end of the wagon-body, and the front axle of the truck is to prevent the forcible contact of the wagon-body with the ground, when the load is being dumped, thus preventing injury to the wagon and load. The mounting of the tail-board by curved arms affords the additional advantage of allowing it to be turned over frontward in position to rest horizontally upon the wagon-body to form a seat for the driver when the wagon is empty.

In the accompanying drawings, Figure 1 represents a side elevation of a dumping-wagon embracing my invention; Fig. 2, a vertical longitudinal section, showing the body in a dumped position; and Fig. 3, a bottom view.

The truck-frame is composed of two side bars or beams, A A, and a front head-block or bolster, B, connecting the same. The side beams diverge from the head-block in a rearward direction, so as to produce a V-shaped frame, or a frame having obliquely arranged side bars. To the rear ends of the diverging frame are applied metallic bands or sockets C, having short axles or journals D for the rear wheels E of the truck. The side bars are of wood—may be re-enforced by top and bottom plates of metal. The wagon-body or box F is pivoted to the truck-frame at or near its center journals $a$, the bottom of the body being for this purpose fitted into bearing-plates or boxes $b$ on the diverging truck-bars.

The wagon-body carries at one side a pivoted locking-lever, G, which is connected at its rear end by a spring, $c$, interposed between the lever and body, while its front end moves in a guide-loop or keeper, $d$. The lever engages in an automatic manner with a hook, H, rising vertically from the head-block, whenever the wagon-body is turned into a horizontal position. When the lever is released the weight of the load, which preponderates toward the rear of the body, causes the latter to tilt or swing in a downward direction between the diverging frame. The load can thus be dumped or discharged with perfect ease and freedom, and without the necessity of shifting a heavily-loaded wagon-body to the rear, as in ordinary dumping-wagons. A swinging gate, I, is applied to the rear or tail end of the wagon-body for the purpose of permitting the discharge of the load; said gate carrying rearwardly-curved arms J, the upper ends of which are fitted upon a pivot-rod, K, passing through or attached to standards or a yoke, L, rising from the sides of the wagon-body. The end gate is locked by means of a lever, M, which is pivoted in ears $f$ underneath the wagon-body, and provided with a weighted rear end, $g$. The front end of the lever is curved or bent to form a hook or stop, $h$, which plays through a slot in the bottom of the wagon-body. When the latter is in a horizontal position the weight of the lever holds the hook or stop $h$ engaged with a catch-plate, $i$, on the lower edge of the end gate; but when the body is tilted to discharge the load the weighted end of the lever comes in contact with a transverse bar or plate, $k$, on the truck-frame, thus turning the lever on its fulcrum, and causing the hook to be released from the end gate. The load, as it descends, raises the end-gate to a point where it will not interfere with the ready discharge of the same. The bottom of the wagon-body is extended in rear of the end-gate, so as to form a chute or discharge-apron, N, and it is provided with an upwardly-turned read end or flange, O. When the wagon is used for carrying brick the chute and flange are serviceable, as the latter will prevent the lower layer or layers from passing out first, thus preventing the breakage of the bricks to a considerable extent.

In order to lessen the shock produced by the fall of the wagon-body or the violent contact of the same with the ground when the load is dumped, I attach to the front pivoted axle P of the truck a spiral spring, Q, which is connected by a chain, R, with a socket or holder, S, on the bottom of the wagon-body. The tension of the spring can be adjusted by means of the chain. When the wagon is empty the tail-board I is swung up over and rests upon the body as a seat for the driver, as shown by dotted lines in Fig. 1.

The following is claimed as new in dumping-wagons, namely:

1. The combination of the end gate I, curved arms J, pivot-rod K, and standards L, and the wagon-body, substantially as described.

2. A tilting wagon-box having an apron or chute, N, with an upwardly-turned flange, O, as an extension of the wagon bottom, substantially as herein described, for the purpose set forth.

3. In combination with the tilting wagon-body and truck-frame, the shock relieving spring Q and chain R, substantially as herein described.

4. The tail-board I, hinged to be turned over frontward upon the wagon-body to form a seat for the driver when the wagon is empty, as described.

In testimony that I claim the foregoing as my own I have affixed my signature in presence of two witnesses.

WILLIAM H. HENKEL.

Witnesses:
 JOHN W. MYERS,
 ROBERT M. BRITTON.